(12) United States Patent
Uneda et al.

(10) Patent No.: US 8,151,111 B2
(45) Date of Patent: Apr. 3, 2012

(54) PROCESSING DEVICE CONSTITUTING AN AUTHENTICATION SYSTEM, AUTHENTICATION SYSTEM, AND THE OPERATION METHOD THEREOF

(75) Inventors: Masatsugu Uneda, Owariasahi (JP); Tsukasa Yasue, Nagakute (JP); Atsuhiro Imaizumi, Owariasahi (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 1309 days.

(21) Appl. No.: 11/797,495

(22) Filed: May 3, 2007

(65) Prior Publication Data

US 2007/0266240 A1 Nov. 15, 2007

(30) Foreign Application Priority Data

May 10, 2006 (JP) .................................. 2006-131605

(51) Int. Cl.
 *H04L 9/00* (2006.01)
(52) U.S. Cl. ........................................... 713/168; 726/2
(58) Field of Classification Search .................. 713/193, 713/159, 168; 726/2–3
See application file for complete search history.

(56) References Cited

U.S. PATENT DOCUMENTS

| | | | | |
|---|---|---|---|---|
| 7,590,860 | B2 * | 9/2009 | Leporini et al. | 713/185 |
| 2004/0088696 | A1 * | 5/2004 | Kawano et al. | 717/171 |
| 2006/0195686 | A1 * | 8/2006 | Makita | 713/2 |
| 2006/0265328 | A1 * | 11/2006 | Yasukura | 705/44 |

FOREIGN PATENT DOCUMENTS

| | | |
|---|---|---|
| JP | 2002-312317 | 10/2002 |
| JP | 2003-162340 A | 6/2003 |
| JP | 2003-263415 | 9/2003 |
| JP | 2003-295965 A | 10/2003 |
| JP | 2004-234633 | 8/2004 |
| JP | 2005-228299 | 8/2005 |
| WO | WO 01/39134 A2 | 5/2001 |
| WO | WO 2005/064547 A1 | 7/2005 |

OTHER PUBLICATIONS

European Search Report issued in European Patent Application No. 07008454.6-2212, mailed Jan. 29, 2010.
Japanese Office Action, with English translation, issued in Japanese Patent Application No. 2006-131605, mailed Apr. 26, 2011.
Japanese Decision of Rejection, w/ English translation thereof, issued in Japanese Patent Application No. 2006-131605, dated Jun. 21, 2011.

* cited by examiner

*Primary Examiner* — Samson Lemma
(74) *Attorney, Agent, or Firm* — McDermott Will & Emery LLP

(57) ABSTRACT

This comprises a storage that stores second partial authentication data that is part of the authentication data and that is the remainder of the first partial authentication data stored in another device, and second partial processing data that is part of the processing data used when doing the process of matching the input data with the authentication data and which is the remainder of the first partial processing data stored in the other device; a receiver that receives the first partial authentication data and the first partial processing data; a data linker that generates the authentication data from the first partial authentication data and the second partial authentication data and that generates the processing data from the first partial processing data and the second partial processing data; and an authentication module that performs authentication by executing the process of matching the input data with the authentication data.

13 Claims, 11 Drawing Sheets

PROCESSING DEVICE CONSTITUTING AN AUTHENTICATION SYSTEM, AUTHENTICATION SYSTEM, AND THE OPERATION METHOD THEREOF

CROSS REFERENCE TO RELATED APPLICATIONS

The present application claims priority from Japanese application JP2006-131605 filed on May 10, 2006, the content of which is hereby incorporated by reference into this application.

BACKGROUND OF THE INVENTION

1. Technical Field

The present invention relates to an authentication system that implements identity verification using a control device and a terminal device.

2. Description of the Related Art

With an authentication system consisting of a control device and an authentication terminal device, authentication is performed by matching the input data input to the authentication terminal device with authentication data prepared in advance. Here, when all the authentication data is stored in one of either the control device or the authentication terminal device, there is the risk that the authentication data is decrypted and illegal authentication is implemented. In light of this, with prior art authentication systems, there was a technique for which authentication data was divided using an electronic tally, and the divided authentication data was held respectively by the control device and the authentication terminal device, such that the authentication data is not decrypted (Unexamined Patent No. 2004-234633). With the prior art, for example, even if one device was stolen, if both devices were not stolen, recovering the authentication data was difficult.

However, with the prior art, the authentication data was divided and stored in the control device and the authentication terminal device, but the processing data used when matching the input data and the authentication data was stored in one or the other of the control device or the authentication terminal device. Here, processing data means algorithms or the like put into data form which is used when matching the input data with the authentication data, and for example, includes items put into data form such as a cryptography key, function, authentication program, library, or the like. When the control device or the authentication terminal device in which the processing data is stored is stolen, by the processing data being analyzed, it is possible for the authentication data to be forged and for identity verification to be implemented. Also, when the processing data is stored in the control device, when the authentication terminal device is changed, by accessing the control device from the changed authentication terminal device, it is possible for the processing data to be stolen, analyzed, for the authentication data to be forged, and for identity verification to be implemented.

Also, when both the control device and the authentication terminal device are stolen, analysis of the authentication data and the processing data becomes easy, and the possibility increases of identity verification being implemented by authentication data forgery.

SUMMARY OF THE INVENTION

The present invention was created in order to address at least part of the problems noted above, and its purpose is to suppress or prevent identity verification by illicit means.

To address the problems noted above, the processing device of the present invention is a processing device constituting an authentication system, comprising a storage that stores second partial authentication data that is part of the authentication data prepared in advance to match the input data that has been input, and that is the remainder of the first partial authentication data stored in a storage of another device constituting the authentication system, and second partial processing data that is part of the processing data used when executing at least part of the process of matching the input data with the authentication data, and which is the remainder of the first partial processing data stored in the storage of the other device; a receiver that receives the first partial authentication data and the first partial processing data from the other device; first data linker that generates the authentication data from the first partial authentication data and the second partial authentication data; second data linker that generates the processing data from the first partial processing data and the second partial processing data; and an authentication module that performs authentication by executing the process of matching the input data with the authentication data based on the processing data.

With the present invention, even for processing data rather than just authentication data, only part of this is stored in the processing device. Therefore, for example, even if partial processing data is known by an outsider by illicit means such as processing device stealing, interception or the like, it is difficult to recover the entire processing data. If the processing data is not recovered, identification data analysis and forgery is difficult, so it is possible to suppress or prevent identity verification by illicit means.

The processing device of the present invention further has device verification data for verifying whether or not the other device is a legitimate device, and when the device verification data satisfies specified conditions, the first linker that generates the authentication data from the first partial authentication data and the second partial authentication data, the second linker that generates the processing data from the first partial processing data and the second partial processing data, and the authentication module that performs authentication by executing the process of matching the input data with the authentication data based on the processing data.

With the present invention, the processing device confirms that the other device is a legitimate device, and after this confirmation, generates/recovers authentication data and processing data. Therefore, when the processing device cannot confirm that the other device is a legitimate device, the authentication data and processing data are not recovered, so there is no reading of the authentication data and processing data and it is possible to suppress or prevent identity verification by illicit means.

The processing device of the present invention, when the device verification data does not satisfy specified conditions, deletes from the storage the data of at least one of the second partial authentication data and the second partial processing data.

With the present invention, when the processing device cannot verify that the other device is a legitimate device, the data of at least one of the second partial authentication data and the second partial processing data is deleted from the storage, so it is not possible to recover the authentication data or the processing data. As a result, it is possible to suppress or prevent identity verification by illicit means.

The processing device of the present invention comprises a battery power source.

With the present invention, even when a processing device comprising a battery power supply is stolen, for example, operation continues for a fixed time because power is supplied from the battery. However, the processing device cannot verify the other device during that time. The processing device deletes data of at least one of the second partial authentication data and the second partial processing data from the storage, so recovery of authentication data or processing data is not possible. As a result, it is possible so suppress or prevent identity verification using illicit means.

The processing device of the present invention is an authentication system control device, comprising first data divider that divides the authentication data into two partial authentication data, second data divider that divides the processing data into two partial processing data, and sending means that sends to the other device one of the two partial authentication data and one of the two partial processing data.

With the present invention, the processing device is equipped with a data divider inside the device, so, for example, it is not necessary to divide the authentication data and processing data using another server device. Therefore, there is no risk of an outflow of authentication data or processing data from another server device. As a result, it is possible so suppress or prevent identity verification using illicit means using leaked authentication data and processing data.

With the processing device of the present invention, the first divider generates two partial authentication data different from the first partial authentication data and the second partial authentication data, the second divider generates two partial processing data different from the first partial processing data and the second partial processing data, the transmitter sends to the other device one of the two generated partial authentication data and one of the two generated partial processing data, and the storage stores the other of the two generated partial authentication data and the other of the two generated partial processing data.

With the present invention, the partial authentication data and the partial processing data divided and generated by the divider of the processing device are different each time, so even when partial authentication data and partial processing data of a certain time are stolen or the like, if dividing is performed again of the authentication data and the processing data, the authentication data and the processing data will not be recovered from the stolen partial authentication data and the partial processing data. Therefore, there is an increase in safety in relation to data theft, and it is possible to suppress or prevent identify verification using illicit means.

The processing device of the present invention is an authentication terminal device of an authentication system, comprising an input data fetcher that fetches input data, and a receiver that receives one of the two partial authentication data divided by the authentication system control device and one of the two partial processing data divided by the control device. With the present invention, the authentication terminal device only holds one partial authentication data and one partial processing data, so for example even if the partial authentication data and the partial processing data stored in the authentication terminal device are stolen or the like, recovery of the authentication data and the processing data is difficult, and it is possible to suppress or prevent identity verification using illicit means.

The authentication system of the present invention is an authentication system consisting of an authentication terminal device and a control device, the authentication terminal device comprising an input data fetcher that fetches the input data, and a storage that stores first partial authentication data that is part of the authentication data prepared in advance for matching the input data, and first partial processing data that is part of the processing data used when executing at least part of the process of matching the input data with the authentication data; and the control device comprising a storage that stores second partial authentication data that is the remainder of the first partial authentication data and second partial processing data that is the remainder of the first partial processing data, first data linker that generates the authentication data from the first partial authentication data and the second partial authentication data, second data linker that generates the processing data from the first partial processing data and the second partial processing data, an authentication module that performs authentication by executing the process of matching the input data with the authentication data based on the processing data, first data divider that divides the authentication data into two partial authentication data, second data divider that divides the processing data into two partial processing data, and a transceiver that sends and receives one of the two partial authentication data and one of the two partial processing data with the authentication terminal device.

With the present invention, the authentication system divides and holds the authentication data and the processing data in the authentication terminal device and the control device. It is only possible to obtain one of the partial authentication data and one of the partial process data from one device. Recovering the authentication data and the processing data from one of the partial authentication data and one of the partial processing data is difficult, so it is possible to suppress or prevent identity verification using illicit means.

The operation method of the authentication system of the present invention is a data management method of an authentication system consisting of an authentication terminal device and a control device, the control device dividing into two partial authentication data the authentication data prepared in advance for matching with the input data in the authentication terminal device, the control device dividing into two partial processing data the processing data used when executing at least part of the process of matching the input data with the authentication data, the authentication terminal device storing in the storage of the authentication terminal device as first partial authentication data one of the divided two partial authentication data, and storing in the storage of the authentication terminal device as first partial processing data one of the divided two partial processing data, the control device storing in the storage of the control device as second partial authentication data the other of the divided two partial authentication data, and storing in the storage of the control device as the second partial processing data the other of the divided two partial processing data, and at a specified time, the control device performing authentication of the authentication terminal device using the control device verification data, and the terminal authentication device performing authentication of the control device using the control device verification data, and when the control device authenticated the terminal authentication device and the authentication terminal device authenticated the control device, the control device linking the first partial authentication data and the second partial authentication data and recovering the authentication data, linking the first partial processing data and the second partial processing data and recovering the processing data, dividing the recovered authentication data into two partial authentication data different from the first partial authentication data and the second partial authentication data, dividing the recovered processing data into two partial processing data different from the first partial processing data and the second partial processing data, the authentication terminal device receiving from the control device as the first partial authentication data one of the divided two partial authentication data and storing this in the storage of the authentication terminal device, receiving from the control device as the first partial processing data one of the divided partial processing data and storing it in the storage of the authentication terminal device, the control device storing in the storage of the control device as the second partial authentication data the other of the divided partial authentication data, and storing in the storage of the control device as the second partial processing data the other of the divided partial processing data, and when the authentication terminal device authenticated the control device, the authentication terminal device deleting at least one of the first partial authentication data or the first partial processing data, and when the control device authenticated the authentication terminal device, the control device deleting at least one of the second partial authentication data or the second partial processing device.

Note that the present invention can be realized with various aspects, and in addition to a processing device and authentication system, can also be realized with various aspects such as an authentication system data management method or the like.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
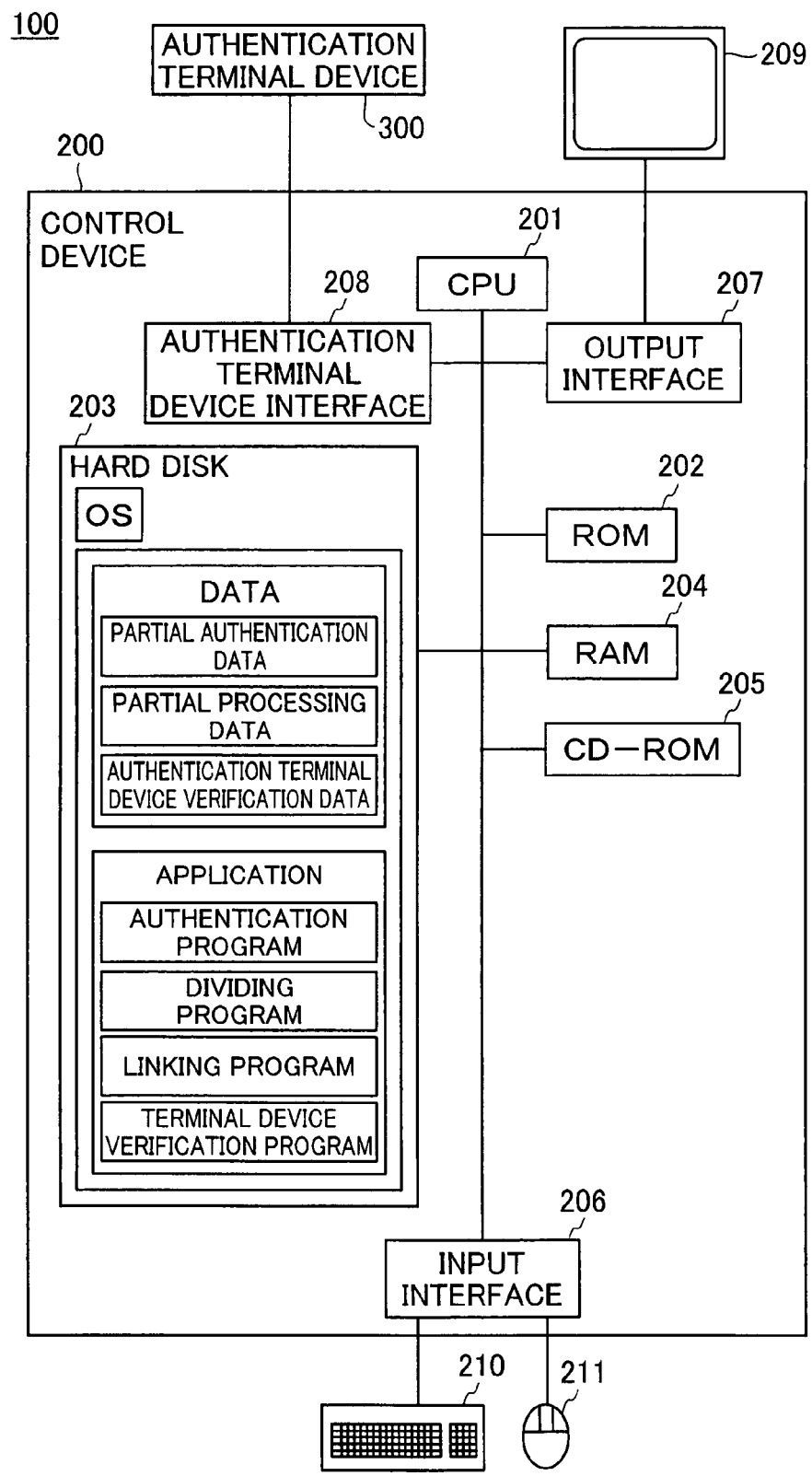
FIG. 1 is an explanatory drawing showing the constitution of the control device of an authentication system.

A. Constitution of the Control Device 200 of the Authentication System 100 of this Embodiment Referring to FIG. 1, described is the control device 200 constituting the authentication system 100 of this embodiment. FIG. 1 is an explanatory drawing showing the constitution of the control device 200 of an authentication system 100. With this embodiment, the authentication system 100 is used for managing entering and leaving from a non-security area (e.g. outdoors) to a security area (e.g. indoors or in a room for which there are restrictions on who can enter), and the control device 200 is installed within the security area.

The control device 200 has a CPU 201, a ROM 202, a hard disk 203, a RAM 204, a CD-ROM 205, an input interface 206, an output interface 207, and an authentication terminal interface 208.

The CPU 201 is the center of the control device 200, an in addition to controlling the overall operation of the control device 200, also performs various calculations, stores the calculation results in the hard disk 203, displays on the display 209 via the output interface 207, and performs communication with the authentication terminal device 300 via the authentication terminal interface 208.

The ROM 202 stores the BIOS (Basic Input Output system) that controls the hard disk 203 connected to the control device 200 and peripheral devices such as the keyboard 210, mouse 211 and the like connected via the input interface 206 connected to the control device 200, and normally, flash memory, which is rewritable non-volatile memory, is used.

The hard disk 203 is a storage device that stores the operating system, data, and applications. For example, the partial authentication data, the partial processing data, and the authentication terminal device verification data are stored as data, and the authentication program, the division program, the linking program, and the authentication terminal device verification program are stored as applications.

The RAM 204 is rewritable volatile memory, the control device 200 operating system (hereafter referred to as "OS") and applications stored in the hard disk 203 are copied onto the RAM 204, and are executed on the RAM 204. The RAM 204 temporarily stores the results of calculation by the CPU 201 or data being calculated.

The authentication data is data prepared in advance to perform authentication by matching with the input data input via the authentication terminal device. With this embodiment, for the authentication data, used are items for which a finger vein blood vessel pattern is made into data. The partial authentication data is data that is part of the authentication data.

The processing data is processing data that is used when executing at least part of the process of matching the input data with the authentication data. Specifically, the processing data is an item such as an algorithm or the like used when matching the input data with the authentication data put into data form, and for example, is a cryptography key, function, authentication program, library or the like put into data form. The partial processing data is data that is part of the processing data.

The authentication terminal device verification data is data for verifying whether the authentication terminal device 300 connected to the control device 200 is a legitimate device or not. For example, the authentication terminal device verification data is also possible to use the authentication terminal device 300 identification number or the like. To prevent forgery of the authentication terminal device 300 identification number, the authentication terminal device verification data is also possible to have this be an item for which encryption processing is done. The CPU 201 matches the authentication terminal device data received from the authentication terminal device 300 with the authentication terminal device verification data, and verifies that the authentication terminal device 300 is a legitimate device.

The authentication program is a program that performs authentication by matching the input data input from the authentication terminal with the authentication data prepared in advance.

The division program is a program that divides the authentication data into first partial authentication data stored in the hard disk 203 of the control device 200 and second partial authentication data stored in the authentication terminal device 300. Also, the division program divides the processing data into the first partial processing data stored in the hard disk 203 of the control device 200 and second partial processing data stored in the authentication terminal device 300. Note that the division program divides the authentication data and the processing data into different partial authentication data and partial processing data each time. As a result of this, when new division is performed, it becomes impossible to recover authentication data and processing data from the previously divided partial authentication data and partial processing data.

The linking program is a program that generates authentication data by linking first partial authentication data stored in the hard disk 203 of the control device 200 and second partial authentication data stored in the authentication terminal device 300. Also, the linking program generates processing data by linking first partial processing data stored in the hard disk 203 of the control device 200 and second partial processing data stored in the authentication terminal device 300.

The authentication device verification program is a program that determines whether or not the authentication terminal device is a legitimate device.

The CD-ROM 205 is a computer read-only storage device that uses a compact disk (hereafter referred to as a "CD"). For example, this is used when installing a program to the control device 200 and re-inputting deleted authentication data and processing data. Note that to make reading on another device difficult, the authentication data and processing data are encrypted and stored in the CD-ROM.

The input interface 206 is connected between, for example, an input device such as the keyboard 210 or mouse 211 and the control device 200. The output interface 207 connects the control device 200 and the display 209, and outputs the authentication results, for example, to the display 209. The authentication terminal interface 208 connects the control device 200 and the authentication terminal device 300.

Figure 2:
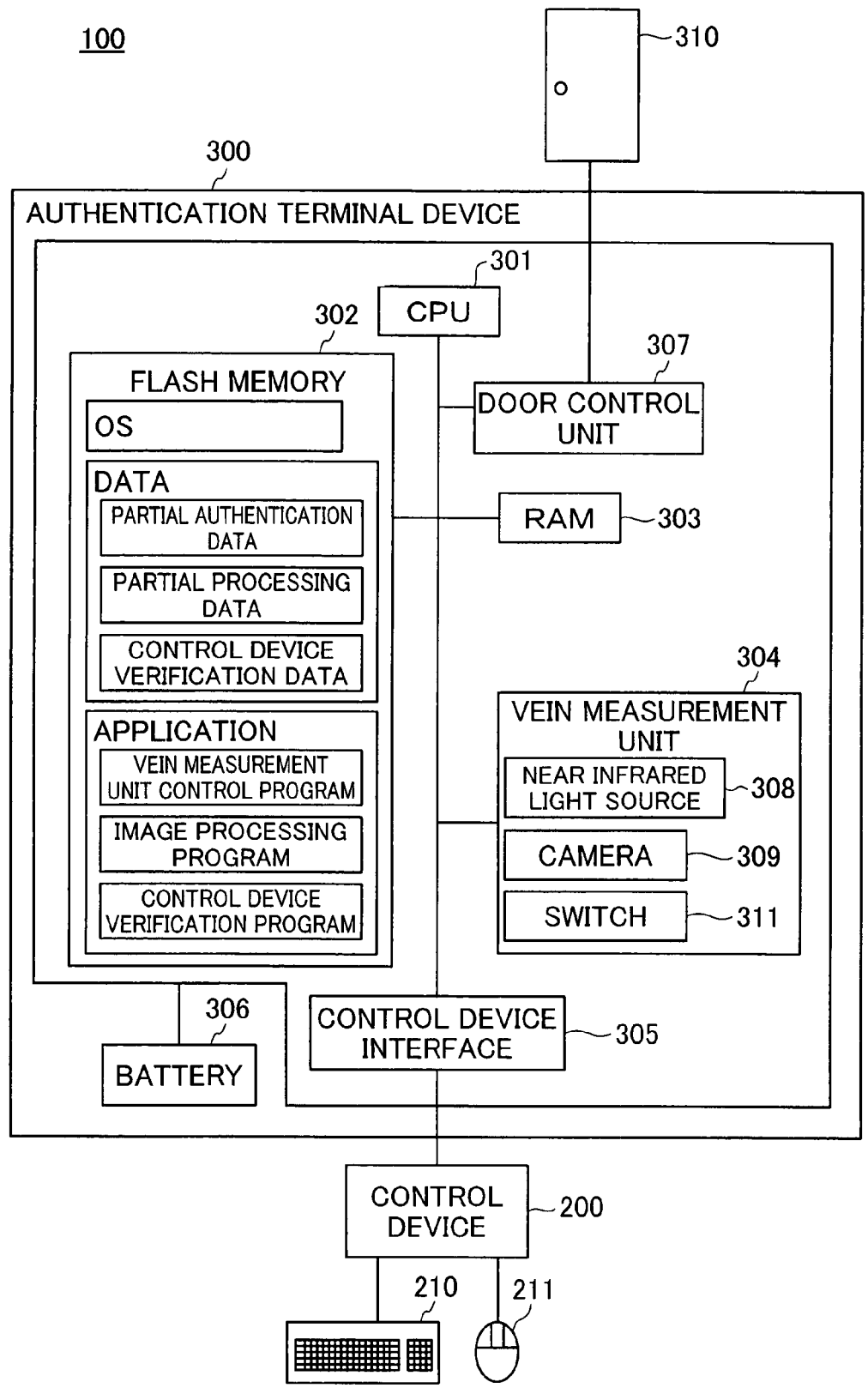
FIG. 2 is an explanatory drawing showing the constitution of the authentication terminal device of an authentication system.

B. Constitution of the Authentication Terminal Device 300 of the Authentication System 100 of this Embodiment Referring to FIG. 2, described is the constitution of the authentication terminal device 300 of the authentication system 100 of this embodiment. FIG. 2 is an explanatory drawing showing the constitution of the authentication terminal device 300 of the authentication system 100. The authentication terminal device 300 is installed in both the security area and the non-security area, for example.

The authentication terminal device 300 has a CPU 301, a flash memory 302, a RAM 303, a vein measuring unit 304, a control device interface 305, a battery 306, and a door control unit 307.

The CPU 301 is the center of the authentication terminal device 300, and controls the overall operation of the authentication terminal device 300.

The flash memory 302 is rewritable non-volatile memory that stores the OS, data, and applications. For example, the partial authentication data, partial processing data, and control device verification data are stored as data, and for example, the vein measurement unit control program, the image processing program, and the control device verification program are stored as applications.

The flash memory 302 stores the second partial authentication data of the authentication data, which is not stored in the hard disk 203 of the control device 200. Also, in the flash memory 302, of the processing data, the second partial processing data that is not stored in the hard disk 203 of the control device 200 is stored.

The control device verification data is data for verifying whether or not the control device 200 connected to the authentication terminal device 300 is a legitimate device, and for example, is the control device 200 identification number or the like. Note that to prevent forgery of the control device 200 identification number, it is also possible to use an item that undergoes encryption processing.

The vein measurement unit control program is a program that controls the vein measurement unit 304 that measures the finger vein blood vessel pattern. The image processing program is a program that converts the image of the finger vein blood vessel pattern measured by the vein measurement unit 304 to digital signals, and generates input data.

The control device verification program is a program that determines whether or not the control device 200 is a legitimate device.

The RAM 303 is rewritable volatile memory, and operating system (hereafter referred to as "OS") or application stored in the flash memory 302 of the authentication terminal device 300 is copied onto the RAM 303 and is executed on the RAM 303. The RAM 303 temporarily stores the results calculated by the CPU 301 or data being calculated.

With the vein measurement unit 304, a finger is placed on the measurement platform (not illustrated), and by the switch 311 at the inside of the measurement platform being pressed by the finger tip, the near infrared rays from the near infrared light source 308 installed at the top part of the measurement platform are irradiated on the finger, the transmitted light is photographed by the camera 309 installed at the bottom part of the measurement platform, and the finger vein pattern is measured.

The control device interface 305 connects the authentication terminal device 300 and the control device 200. The battery 306 is auxiliary power for having the authentication terminal device 300 operating temporarily even when the AC power of the authentication terminal device 300 is cut.

The door control unit 307 controls the opening and closing of the key of the security door 310 connected to the authentication terminal device 300.

Figure 3:
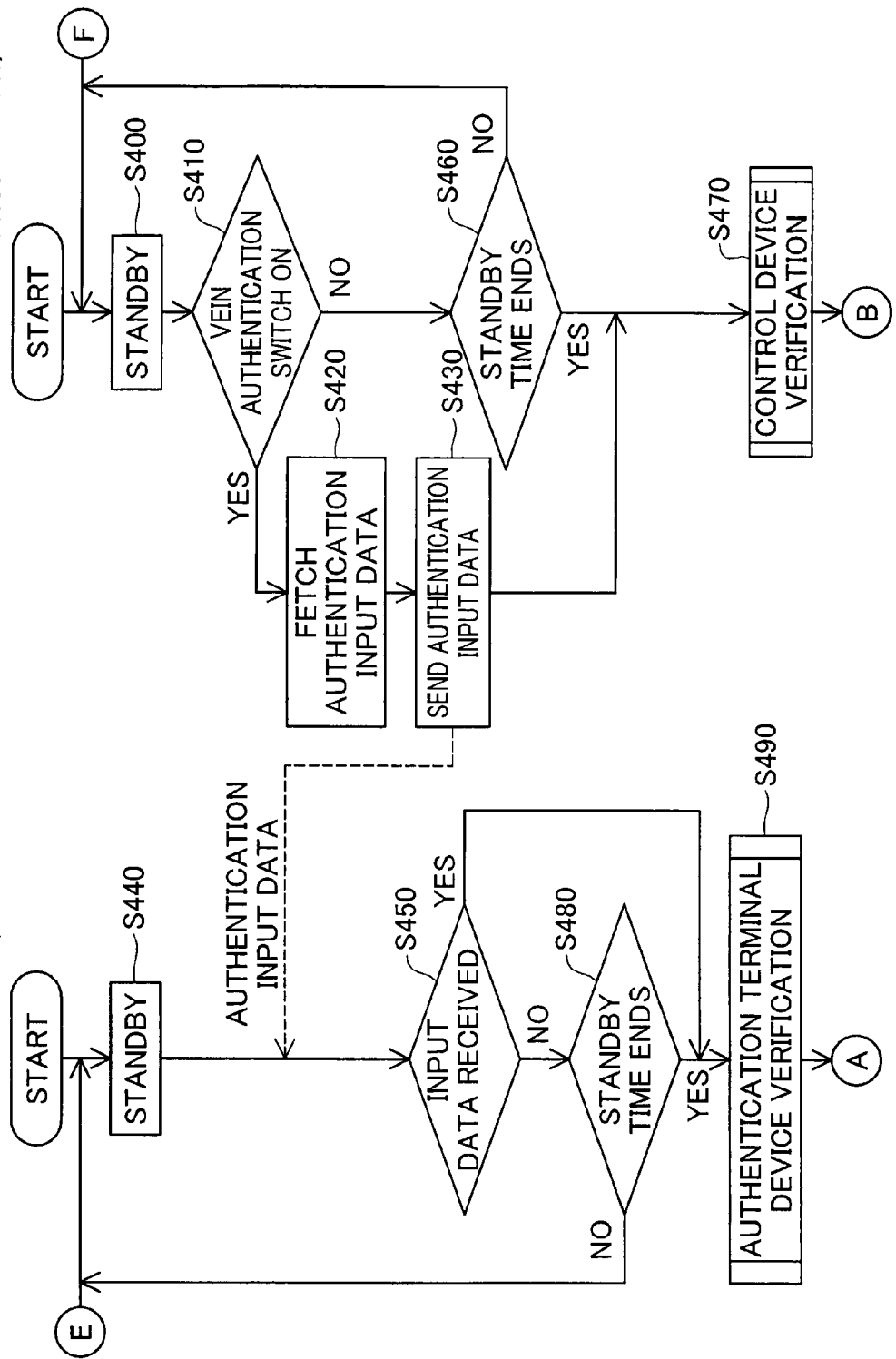
FIG. 3 is an explanatory drawing showing a flow chart of the operation (up to device verification) executed during authentication of the authentication system of this embodiment.
Figure 4:
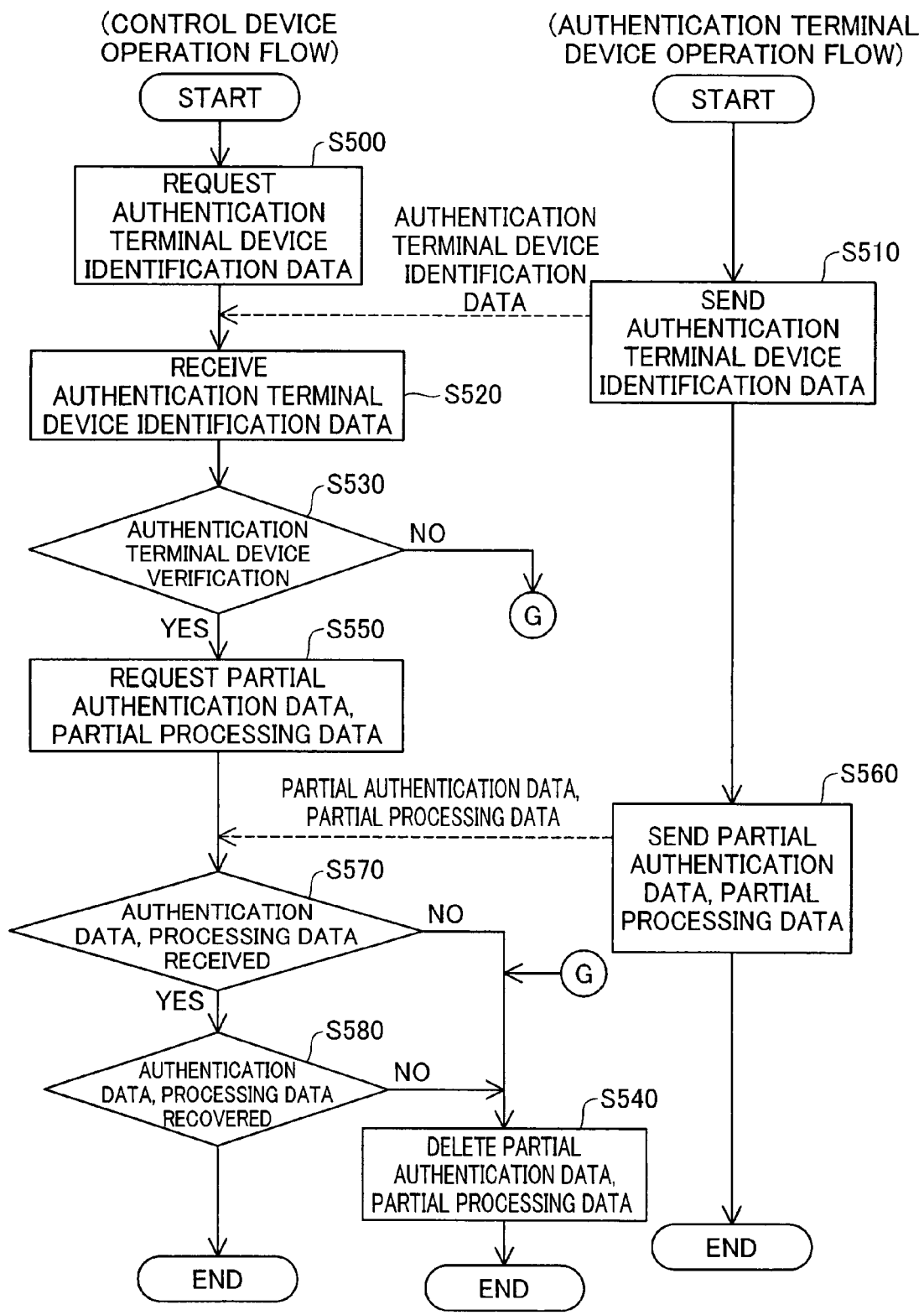
FIG. 4 is an explanatory drawing showing a flow chart of the process of the control device verifying the authentication terminal device.
Figure 5:
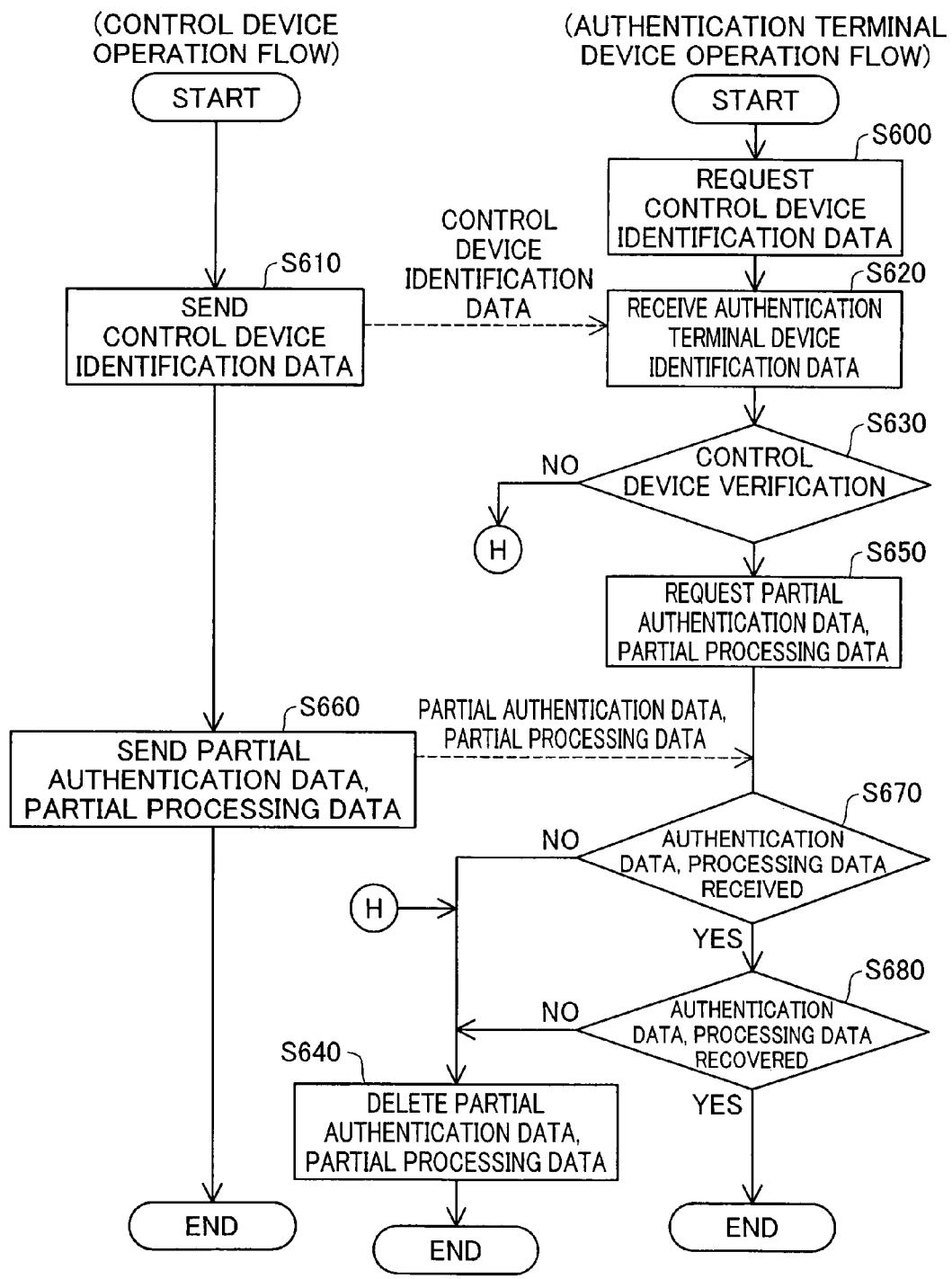
FIG. 5 is an explanatory drawing showing a flow chart of the process of the authentication terminal device verifying the control device.
Figure 6:
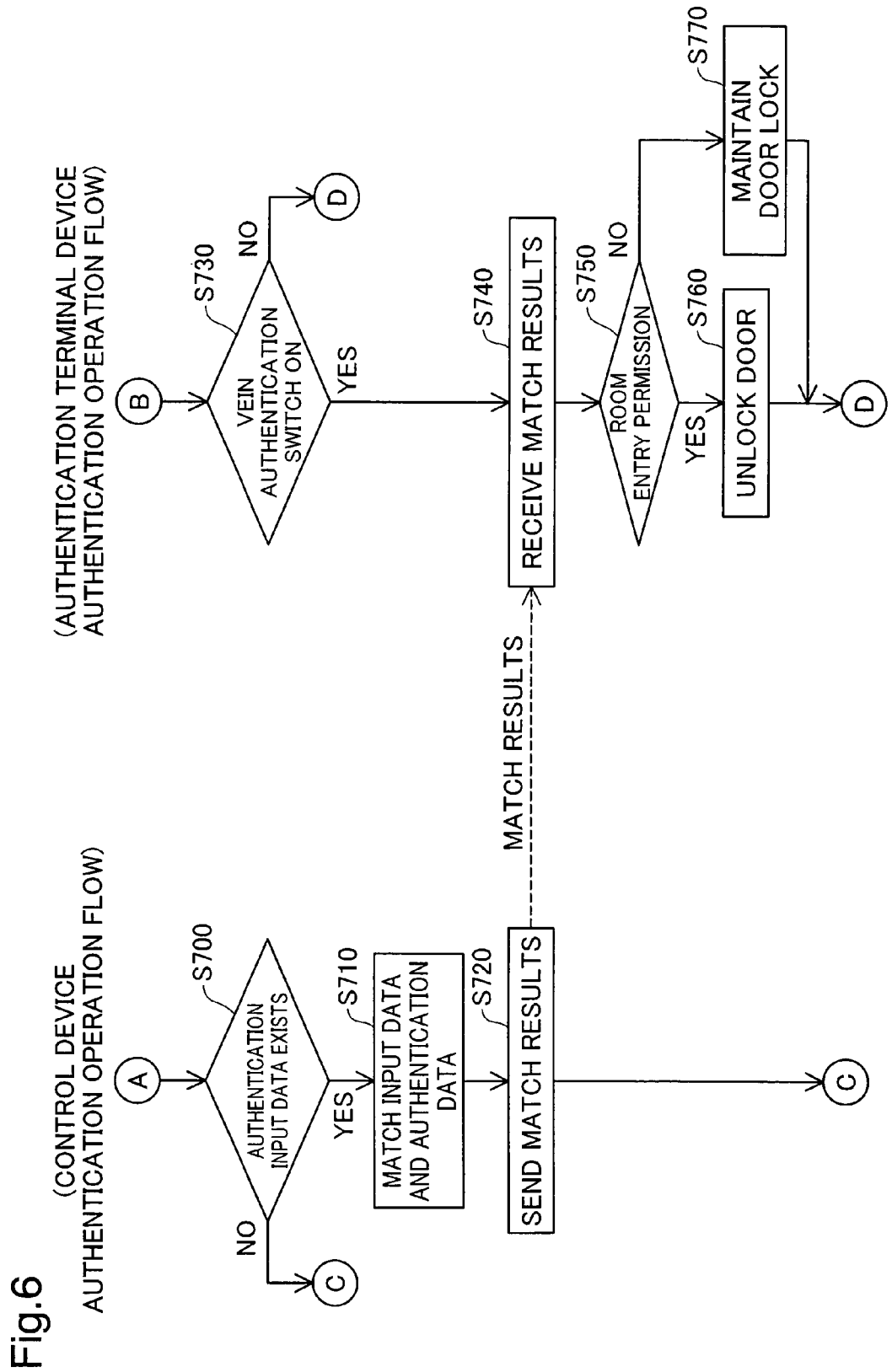
FIG. 6 is an explanatory drawing showing a flow chart of the operation (from device verification up to authentication) executed during authentication of the authentication system of this embodiment.
Figure 7:
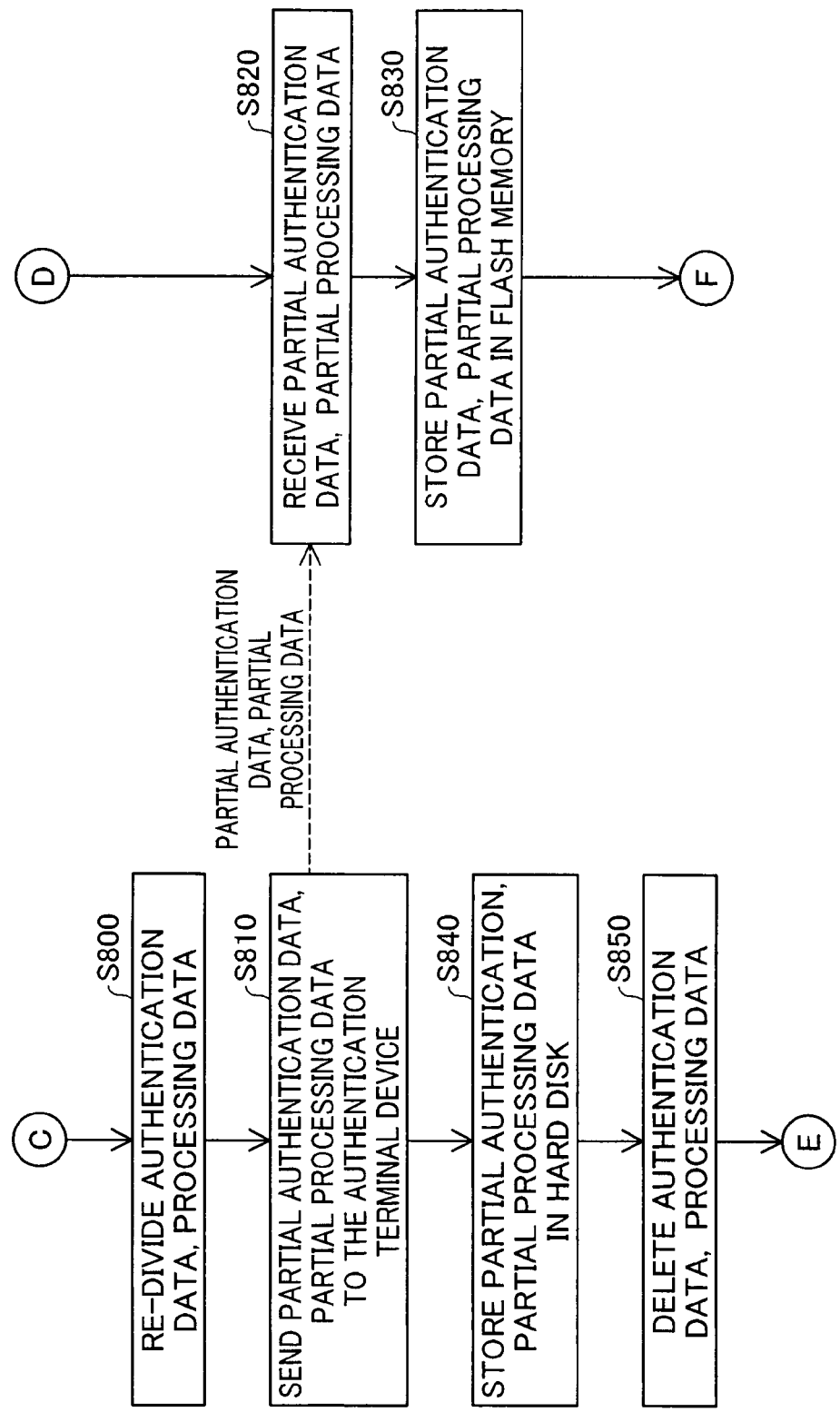
FIG. 7 is an explanatory drawing showing a flow chart of the operation (re-division process of the authentication data and the processing data) executed during authentication of the authentication system of this embodiment.
Figure 8A:
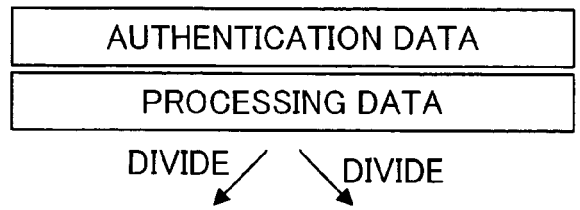
FIG. 8 is a conceptual explanatory drawing of the storage status of the authentication data and the processing data when neither the control device nor the authentication terminal device is stolen.
Figure 8B:
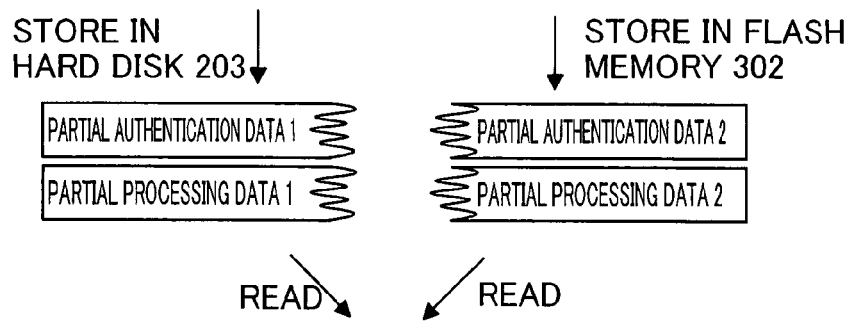
Figure 8C:
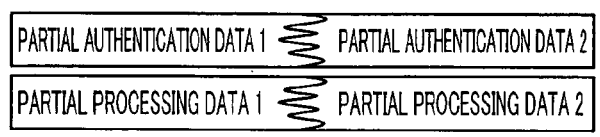
Figure 8D:
Figure 8E:
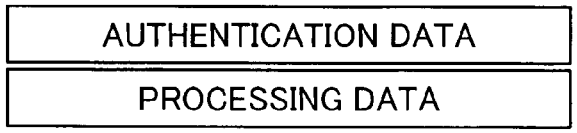
Figure 9A:
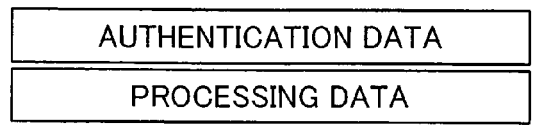
FIG. 9 is a conceptual explanatory drawing of the storage status of the authentication data and the processing data when the authentication terminal device is stolen.
Figure 9B:
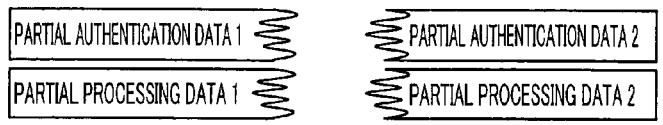
Figure 9C:
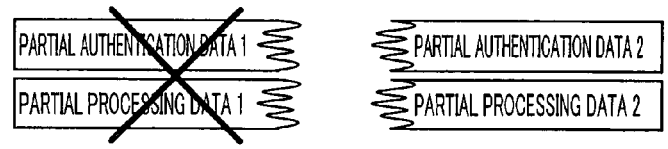
Figure 9D:
Figure 10A:
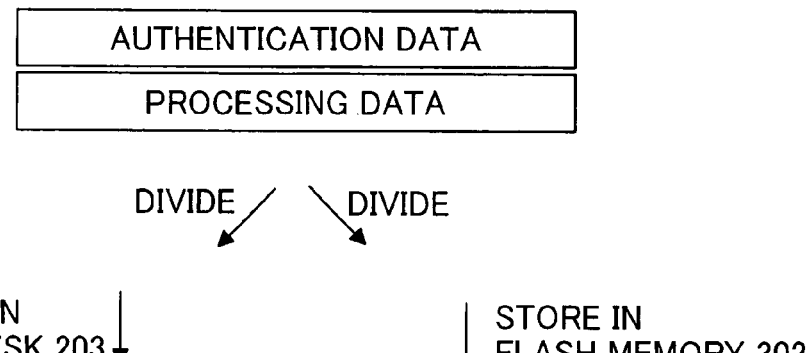
FIG. 10 is a conceptual explanatory drawing of the storage status of the authentication data and the processing data when the control device is stolen.
Figure 10B:
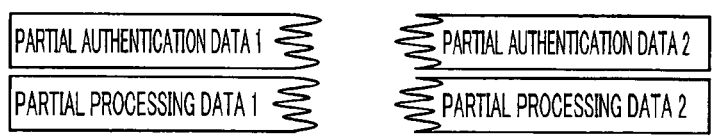
Figure 10C:
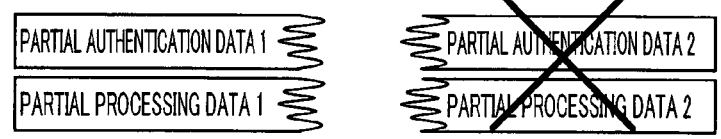
Figure 10D:
Figure 11A:
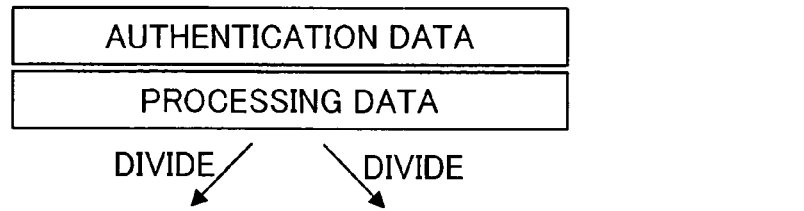
FIG. 11 is a conceptual explanatory drawing of the storage status of the authentication data and the processing data when both the control device and the authentication terminal device are stolen.
Figure 11B:
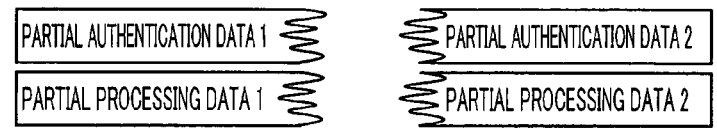
Figure 11C:
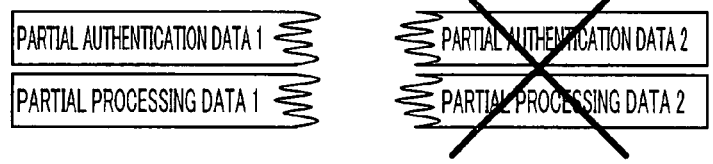
Figure 11D:
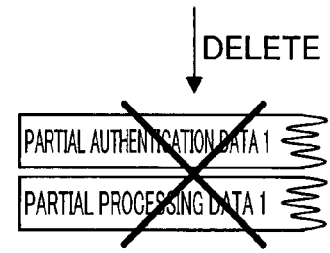
Figure 11E:

C. Operation During Authentication of the Authentication System 100 of this Embodiment Referring to FIG. 3 through FIG. 11, the operation and storage status of the authentication data and the processing data during authentication of the authentication system 100 of this embodiment are discussed. FIG. 3 is an explanatory drawing showing a flow chart of the operation up to device verification of the authentication system 100 of this embodiment. FIG. 4 is an explanatory drawing showing a flow chart of the process of the control device verifying the authentication terminal device. FIG. 5 is an explanatory drawing showing a flow chart of the process of the authentication terminal device verifying the control device. FIG. 6 is an explanatory drawing showing a flow chart of the operation from device verification up to authentication of the authentication system 100 of this embodiment. FIG. 7 is an explanatory drawing showing a flow chart of the re-division process of the authentication data and the processing data of the authentication system 100 of this embodiment. Note that in FIG. 3 through FIG. 7, the flow on the left side is the operation flow of the control device, and the flow on the right side is the operation flow of the authentication terminal device.

FIG. 8 is a conceptual explanatory drawing of the storage status of the authentication data and the processing data when neither the control device nor the authentication terminal device is stolen. FIG. 9 is a conceptual explanatory drawing of the storage status of the authentication data and the processing data when the authentication terminal device is stolen. FIG. 10 is a conceptual explanatory drawing of the storage status of the authentication data and the processing data when the control device is stolen. FIG. 11 is a conceptual explanatory drawing of the storage status of the authentication data and the processing data when both the control device and the authentication terminal device are stolen.

First, described is the operation up to device verification using FIG. 3 and FIG. 8 through FIG. 11.

In the state with the authentication system started, as shown in FIG. 8 (*a*) to FIG. 11 (*a*) and from FIG. 8 (*b*) to FIG. 11 (*b*), the authentication data is divided into first partial authentication data and second partial authentication data, and the processing data is divided into first partial processing data and second partial processing data. For example, after the authentication data aligned in a row, the authentication data is divided into two parts that are forward part and backward part using a random number. The division is simply dividing the data row into two parts that are forward part and backward part, so authentication data linking and recovery are executed easily. The first partial authentication data and the first partial processing data are stored in the hard disk 203 of the control device 200, and the second partial authentication data and the second partial processing data are stored in the flash memory 302 of the authentication terminal device 300.

The CPU 301 of the authentication terminal device 300 is in standby until the authentication operation starts (step S400) after the switch 311 of the vein measuring unit 304 is pressed (step S410, Yes). When the authentication operation is started, the CPU 301 fetches the authentication input data for identity verification in order to match with the authentication data prepared in advance (step S420).

When a finger is placed on the measurement platform (not illustrated) and the switch 311 which is at the inside of the measurement platform is pressed by the fingertip, near infrared rays from the near infrared light source 308 installed at the top part of the measurement platform are irradiated on the finger. The reduced hemoglobin of the red blood cells in the veins absorbs the light of the near infrared rays wavelength. When the transmitted light is photographed by the camera 309 installed at the bottom part of the measurement platform, only the vein parts are seen as black. By doing this, the finger vein blood vessel pattern is measured. The CPU 301 processes the measured finger vein blood vessel pattern using the image processing program, creates authentication input data, and sends authentication input data to the control device 200 (step S430).

The CPU 201 of the control device 200 is in standby (step S440) until the authentication input data is received from the authentication terminal device 300 (step S450, Yes).

Even when the switch 311 of the vein measurement unit 304 is not pressed (step S410, No), when a specified time has elapsed (step S460, Yes), the CPU 301 performs verification of the control device 200 (step S470). Meanwhile, even when input data is not received (step S450, No), when a specified time has elapsed (step S480, Yes), the CPU 201 performs verification of the authentication terminal device 300 (step S490). The specified time can be a set time each time or can also be a random time.

Next, described is the process of the control device 200 verifying the authentication terminal device 300 using FIG. 4, FIG. 8, and FIG. 9.

The CPU 201 of the control device 200 makes a request for authentication terminal identification data to the authentication terminal device 300 (step S500). When the request for the authentication terminal device identification data is received, the CPU 301 of the authentication terminal device 300 sends the authentication terminal device identification data to the control device 200 (step S510).

The CPU 201 receives authentication terminal device identification data (step S520) and performs verification of the authentication terminal device 300 (step S530). The CPU 201 compares the received authentication terminal device identification data with the authentication terminal device verification data stored in the hard disk 203, and determines whether or not the authentication terminal device 300 is a legitimate device. When the CPU 201 cannot verify that the authentication terminal device 300 is a legitimate device (step S530, No), the CPU 201 deletes the first partial authentication data and the first partial processing data stored in the hard disk 203 as shown in FIG. 9 (*c*) (step S540). As shown in FIG. 9 (*d*), when the first partial authentication data and the first partial processing data are deleted, the authentication data and the processing data are not recovered.

When the CPU 201 can verify that the authentication terminal device 300 is a legitimate device (step S530, Yes), the CPU 201 makes a request to the authentication terminal device 300 for the second partial authentication data and the second partial processing data (step S550). When the CPU 301 of the authentication terminal device 300 receives a request for the second partial authentication data and the second partial processing data from the control device 200, the CPU 301 reads the second partial authentication data and the second partial processing data from the flash memory 302, and sends to the control device 200 (step S560).

The CPU 201 receives the second partial authentication data and the second partial processing data (step S570). As shown in FIG. 8 (*c*), the CPU 201 reads the first partial authentication data from the hard disk 203, links this with the received second partial authentication data and recovers the authentication data, reads the first partial processing data from the hard disk 203, links this with the received second partial processing data and recovers the processing data (step S580). Recovery can be performed, for example, by simply linking the first partial authentication data and the second partial authentication data, and by simply linking the first partial processing data and the second partial processing data.

When the second partial authentication data and the first partial authentication data are linked simply, for example, it is possible to have the control device 200 hold a public key A and a secret key B, and have the authentication control device 300 hold the public key C and the secret key D. When the CPU 301 of the authentication terminal device 300 sends the second partial authentication data and the second partial processing data to the control device 200, the second partial authentication data and the second partial processing data are encrypted by the public key A and sent. The CPU 201 of the control device 200 receives the encrypted second partial authentication data and the second partial processing data. The CPU 201 decodes the second partial authentication data and the second partial processing data. The CPU 201, by simply linking the first partial authentication data and the second partial authentication data, and simply linking the first partial processing data and the second partial processing data, is able to execute recovery of the authentication data and the processing data. Note that in the encrypted state, even when the second partial authentication data is simply linked with the first partial authentication data, the authentication data is not recovered. Even if the second partial authentication data or the second partial processing data is stolen during communication, recovery of the second partial authentication data or the second partial processing data is difficult.

When the CPU 201 is not able to receive the second partial authentication data and the second partial processing data (step S570, No), or when there is an abnormality in the second partial authentication data and the second partial processing data and the CPU 201 cannot recover the authentication data and the processing data (step S580, No), as shown in FIG. 9 (c), the CPU 201 deletes the first partial authentication data and the second partial processing data from the hard disk 203 (step S540). When there is an abnormality in the second partial authentication data means, for example, a case when the check sum of the second partial authentication data is incorrect. When it is not possible to recover the authentication data means, for example, when it is not possible to decode the second partial authentication data using the secret key B, or when the check sum of the second authentication data decoded by the secret key B is incorrect, or when the recovered authentication data check sum is incorrect. Note that this is also the same with processing data as well. The CPU 201 displays that the authentication terminal device 300 is abnormal on the display 209, and ends the operation of the control device 200.

When CPU 201 is able to recover the authentication data and the processing data (step S580, Yes), the CPU 201 matches the input data with the authentication data or re-divides the authentication data and the processing data. The CPU 301 waits for the input data and authentication data matching results, or waits for sending of the partial authentication data and partial processing data made by re-dividing of the authentication data and the processing data.

The process of the authentication terminal device 300 verifying the control device 200 is described using FIG. 5, FIG. 8, FIG. 10, and FIG. 11.

The CPU 301 of the authentication terminal device 300 makes a request for control device identification data to the control device 200 (step S600). When the CPU 201 of the control device 200 receives the request for control device identification data, the CPU 201 sends the control device identification data to the authentication terminal device 300 (step S610).

The CPU 301 receives the control device identification data (step S620), and performs verification of the control device 200 (step S630). The CPU 301 compares the received control device identification data and control device verification data stored in the flash memory 302, and determines whether or not the control device 200 is a legitimate device.

When the CPU 301 cannot verify that the control device 200 is a legitimate device (step S630, No), as shown in FIG. 10 (c), the CPU 301 deletes the second partial authentication data and the second partial processing data stored in the flash memory 302 (step S640). When the second partial authentication data and the second partial processing data are deleted, as shown in FIG. 10 (d), the authentication data and the processing data are not recovered.

Note that when both the authentication terminal device 300 and the control device 200 are stolen, the authentication terminal device 300 operates by the battery 306, but the control device 200 has its power supply cut off, so does not operate. Therefore, the CPU 301 of the authentication terminal device 300 cannot verify the control device 200, so as shown in FIG. 11 (c), deletes the second partial authentication data and the second partial processing data. Note that when the power supply of the control device 200 is restored, since the second partial authentication data and the second partial processing data are deleted from the authentication terminal device 300, the CPU 201 cannot receive the second partial authentication data and the second partial processing data from the authentication terminal device 300. As a result, as shown in FIG. 11 (d), the CPU 201 deletes the first partial authentication data and the first partial processing data. In either case, it is not possible to recover the authentication data and the processing data as shown in FIG. 11 (e).

When the CPU 301 can verify that the control device 200 is a legitimate device (step S630, Yes), the CPU 301 makes a request to the control device 200 for the first partial authentication data and the first partial processing data (step S650).

When the CPU 201 of the control device 200 receives the request for the first partial authentication data and the first partial processing data from the authentication terminal device 300, the CPU 201 reads the first partial authentication data and the first partial processing data from the hard disk 203, and sends the first partial authentication data and the first partial processing data to the authentication terminal device 300 (step S660).

The CPU 301 receives the first partial authentication data and the first partial processing data (step S670). As shown in FIG. 8 (c), the CPU 301 reads the second partial authentication data from the flash memory 302, links the second partial authentication data with the received first partial authentication data and recovers the authentication data, reads the second partial processing data from the flash memory 302, links the second partial processing data with the received first partial processing data and recovers the processing data (step S680). Recovery is performed by, for example, simply linking the first partial authentication data and the second partial authentication data, and by simply linking the first partial processing data and the second partial processing data.

The CPU 201 of the control device 200, when the CPU 201 sends the first partial authentication data and the first partial processing data to the authentication terminal device 300, for example, sends the first partial authentication data and the first partial processing data encrypted by the public key C. The CPU 301 of the authentication terminal device 300 receives the encrypted first partial authentication data and the first partial processing data. The CPU 301 decodes the first partial authentication data and the first partial processing data. The CPU 301 is able to execute recovery of the authentication data and the processing data by doing simple linking of the first partial authentication data and the second partial authentication data, and simple linking of the first partial processing data and the second partial processing data. Note that in the encrypted state, even when the first partial authentication data and the second partial authentication data are simply linked, the authentication data cannot be recovered.

When the CPU 301 is not able to receive the first partial authentication data and the first partial processing data (step S670, No), or when the CPU 301 cannot recover the authentication data and the processing data because there is an abnormality in the first partial authentication data and the first partial processing data (step S680, No), as shown in FIG. 10 (c), the CPU 301 deletes the second partial authentication data and the second partial processing data from the flash memory 302 (step S640). When there is an abnormality in the first partial authentication data means, for example, a case when the check sum of the first partial authentication data is incorrect. When it is not possible to recover the authentication data means, for example, when it is not possible to decode the first partial authentication data using the secret key D, and when the check sum of the first authentication data decoded by the secret key D is incorrect, and when the recovered authentication data check sum is incorrect. Note that this is also the same with processing data as well.

The CPU 301 waits for the matching results of the input data and the authentication data, or waits for sending of the partial authentication data and partial processing data made by re-dividing of the authentication data and the processing data.

The process from device verification up to authentication is described using FIG. 6.

When the CPU 201 of the control device 200 has received the authentication input data (step S700, Yes), the CPU 201 matches the authentication input data with the recovered authentication data (step S710). The CPU 201 sends the matching results to the terminal control device 300 (step S720).

When the switch 311 of the vein measurement unit 304 is pressed (step S730, Yes), the CPU 301 of the authentication terminal device 300 receives the matching results (step S740) and judges whether or not room entry permission is possible (step S750). When the CPU 301 judged that room entry is permitted (step S750, Yes), the CPU 301 unlocks the security door 310 (step S760). Meanwhile, when the CPU 301 judged that room entry is not permitted (step S750, No), the CPU 301 maintains the lock of the security door 310 (step S770).

The process of re-dividing the authentication data and the processing data is described using FIG. 7 and FIG. 8.

The CPU 201 of the control device 200 re-divides the authentication data and processing data, and generates a third partial authentication data and fourth partial authentication data and a third partial processing data and fourth partial processing data (step S800). As shown in FIG. 8 (d), at this time the CPU 201 does division so that the third partial authentication data and fourth partial authentication data are respectively different from the first partial authentication data and second partial authentication data, and does division so that the third partial processing data and fourth partial processing data are respectively different from the first partial processing data and the second partial processing data. The CPU 201 divides the authentication data into two parts that are forward part and backward part using a random number, for example. Since this is divided in two using a random number, the resulting two partial authentication data are different each time. Also, since the authentication data is only divided in two parts that are forward part and backward part, it is easily possible to recover by simple linking.

The CPU 201 sends the fourth partial authentication data and the fourth partial processing data to the authentication terminal device 300 (step S810), and stores the third partial authentication data and the third partial processing data in the hard disk 203 (step S840). At this time, it is good if the CPU 201 encrypts the fourth partial authentication data and the fourth partial processing data using the public key C and sends the encrypted fourth partial authentication data and the encrypted fourth partial processing data to the authentication terminal device 300. The CPU 201 deletes the recovered authentication data and processing data from on the RAM 204 (step S850).

When the CPU 301 of the authentication terminal device 300 receives the fourth partial authentication data and the fourth partial processing data from the control device 200 (step S820), the CPU 301 stores the fourth partial authentication data and the fourth partial processing data in the flash memory 302 (step S830). At this time, when the fourth partial authentication data and the fourth partial processing data are encrypted, the CPU 301 decodes the encrypted fourth partial authentication data and the encrypted fourth partial processing data by using the secret key D, and stores the decoded fourth partial authentication data and the decoded fourth partial processing data in the flash memory 302. The CPU 301 returns to step S400, and waits for the switch 311 of the vein authentication unit 304 to be pressed.

The CPU 301 is in standby (step S400) until the switch 311 of the vein authentication device 304 is pressed (step S410). The CPU 201 returns to step S440, and is in standby (step S440) until the authentication input data is received from the authentication terminal device 300 (step S450). When the switch 311 of the vein authentication unit 304 is pressed, or at a specified time, the contents described above are repeated again, and as shown in FIG. 8 (e), the authentication data and processing data are recovered.

Thereafter, each time the switch 311 of the vein authentication unit 304 is pressed, or at each specified time, the same process is repeated.

As described above, with this embodiment, not only the authentication data prepared in advance for matching with the input data, but also processing data used when executing at least part of the process of matching the input data with the authentication data is divided and stored in the control device and the authentication terminal device. Recovering processing data from the partial processing data of one device is difficult. Specifically, the partial processing data is part of the item for which an authentication algorithm or the like was put into data form, so analogizing or recovering the overall processing data from the partial processing data is difficult. If it is not possible to recover the processing data, then analysis of the identification data is not possible. Therefore, forgery of the identification data is difficult, and it is possible to suppress or prevent identity verification using illicit means.

With this embodiment, for example, the control device 200 generates/recovers the authentication data and processing data after verifying that the authentication terminal device 300 is a legitimate device using the authentication terminal device identification data and the authentication terminal verification data, so the authentication data and processing data are not recovered until after the control device 200 verifies the authentication terminal device 300. Therefore, during this time, reading the authentication data and the processing data from the control device 200 is difficult. As a result, it is possible to suppress or prevent identity verification using illicit means.

With this embodiment, the recovered authentication data and processing data themselves are not stored in the hard disk 203 and the flash memory 302. For example, when the control device 200 is stolen immediately after the authentication data and processing data are recovered, the AC power supply is cut off, so the recovered authentication data and processing data are deleted. Therefore, it is possible to suppress or prevent analysis of the authentication data and processing data even when the control device is stolen.

With this embodiment, the control device regularly verifies that the authentication terminal device is a legitimate authentication terminal device, and when the control device cannot verify this, the control device deletes the first partial authentication data and the first partial processing data, and the authentication terminal device regularly verifies that the control device is a legitimate control device, and when the authentication terminal device cannot verify this, the authentication terminal device deletes the second partial authentication data and the second partial processing data. Therefore, for example, when it is not possible to verify the other device such as when the authentication terminal device or the control device is temporarily changed, the partial authentication data and the partial processing data are deleted. As a result, even when the changed control device or authentication terminal device are returned to their original places, it is not possible to recover the authentication data and the processing data. As a result, analysis and forgery of the authentication data is difficult, and it is possible to suppress or prevent identity verification using illicit means.

Note that even when either of the control device or the authentication terminal device deletes the partial authentication data and partial processing data, if the authentication data and the processing data are recorded in a CD-ROM, for example, it is possible to restore the authentication data and the processing data by reading the authentication data and the processing data from the CD-ROM.

With this embodiment, when both the control device and the authentication terminal device are stolen, the control device operates with an AC power supply, so when the authentication terminal device is stolen, the power supply goes off. Meanwhile, the authentication terminal device has an internal battery 306, so the authentication terminal device can operate at least for a set time without the AC power supply. During that time, if the authentication terminal device performs the process of verifying the control device, since the authentication terminal device cannot verify the control device, the authentication terminal device delete the second partial authentication data and the second partial processing data. Therefore, even when the power is restored to the control device, the authentication data and the processing data are not recovered. Furthermore, since the second partial authentication data and the second partial processing data of the authentication terminal device do not exist, the first partial authentication data and the first partial processing data are also deleted. As a result, even when both the control device and the authentication terminal device are stolen, it is difficult to recover the authentication data and the processing data, so it is possible to suppress or prevent identity verification using illicit means.

With this embodiment, the control device has a data divider, so it is not necessary to divide the authentication data and the processing data with another server device. Therefore, there is no danger of the authentication data and processing data leaking from the other server device. As a result, it is possible to suppress or prevent identity verification using illicit means.

With this embodiment, the division pattern of the authentication data and the processing data is different each time. For example, even when the partial authentication data and the partial processing data of a certain time are stolen, if re-division of the authentication data and the processing data is performed, that stolen partial authentication data and partial processing data cannot be used. As a result, when changed to the device in which that stolen partial authentication data and partial processing data are stored, the authentication data and the processing data are not recovered. It is possible to suppress or prevent identity verification using illicit means.

D. Variation Examples (1) With this embodiment, the division of the authentication data and the processing data is performed by the control device, but the division of the authentication data and the processing data can also be performed by the authentication terminal device.

(2) With this embodiment, the CPU 201 divides the authentication data so that the first partial authentication data and the second partial authentication data are different, but it is also possible to divide them so that a part overlaps at that time. It is also possible to divide the processing data so that there is partial overlap of the first partial processing data and the second partial processing data. It is also possible to use a random number to determine whether there is partial overlap of data and the size of the part of the data that overlaps when there is overlap.

(3) With this embodiment, data was not divided for the control device identification data, the authentication terminal device identification data, the control device verification data, and the authentication terminal device verification data, but it is also possible to divide and store data with the control device and identification device for the control device identification data, the authentication terminal device identification data, the control device verification data, and the authentication terminal device verification data.

(4) It is also possible to not perform verification of the corresponding authentication terminal device and control device for a fixed time after startup. This is because there are times when the corresponding authentication terminal device or control device does not start up immediately after startup of the control device or authentication device.

(5) With this embodiment, when the CPU 301 of the authentication terminal device 300 verifies the control device 200, a request was made for partial authentication data and partial processing data, but it is also possible to verify the control device 200 only with the control device identification data without requesting the partial authentication data and partial processing data.

(6) With this embodiment, the authentication terminal device has a battery, but it is also possible that the control device has a battery. It is also possible that both the control device and the authentication terminal device have batteries, and the battery continuation time of the control device is different from the battery continuation time of the authentication terminal device. This is because if one of the control device and the authentication terminal device stops before the other device, it is possible to delete the partial authentication data and the partial processing data from the device that is operating.

(7) With this embodiment, when sending and receiving partial authentication data and partial processing data, encryption was done using public key encryption, but it is also possible to do encryption using common key encryption. It is also possible to not use encryption.

(8) With this embodiment, the authentication system was used for management of entering and leaving, but for example, the authentication system can also be used if the authentication system is an item requiring identity verification such as access management to an ATM, electronic applications, secret data or the like.

(9) With this embodiment, a finger vein blood vessel pattern was used as the identity verification means, but for example, it is also possible to use biological information such as the face shape, hand palm shape, finger print, retina blood vessel pattern, voice print or the like, as well as an IC card, secret number, password, pass phrase or the like.

Above, aspects of implementing the present invention were described based on several embodiments, but the aspects of implementing the invention noted above are for making the present invention easy to understand, and do not limit the present invention. It goes without saying that the present invention can be changed and improved without straying from the key points and the patent claims, and the present invention also includes equivalent items thereof.

What is claimed is:

1. A processing device of an authentication system, comprising:
    a storage device that stores second partial authentication data that is part of authentication data prepared in advance to match input data that has been input, and that is remainder of the first partial authentication data stored in a storage device of another processing device of the authentication system, and that stores second partial processing data that is part of processing data used when executing at least part of the process of matching the input data with the authentication data, and which is the remainder of first partial processing data stored in the storage device of the other processing device;
    a receiver that receives the first partial authentication data and the first partial processing data from the other processing device;
    a first data linker that generates the authentication data from the first partial authentication data and the second partial authentication data;
    a second data linker that generates the processing data from the first partial processing data and the second partial processing data; and
    an authentication module that performs authentication by executing the process of matching the input data with the authentication data based on the processing data, wherein:
    the processing device further has device verification data for verifying whether or not the other processing device is a legitimate device,
    when the device verification data satisfies specified conditions, the first data linker generates the authentication data from the first partial authentication data and the second partial authentication data, the second linker generates the processing data from the first partial processing data and the second partial processing data, and the authentication module performs authentication by executing the process of matching the input data with the authentication data based on the processing data, and
    when the device verification data does not satisfy specified conditions, the processing device deletes from the storage device the first partial authentication data and the first partial processing data.

2. A processing device in accordance with claim 1, further comprising a battery power source.

3. A processing device in accordance with claim 1, wherein the processing device is an authentication system control device, comprising:
    a first data divider that divides the authentication data into two partial authentication data;
    a second data divider that divides the processing data into two partial processing data; and
    a transmitter that sends to the other processing device one of the two partial authentication data and one of the two partial processing data.

4. A processing device in accordance with claim 1, wherein the processing device is an authentication system control device, comprising:
    a first data divider that divides the authentication data into two partial authentication data;
    a second data divider that divides the processing data into two partial processing data; and
    a transmitter that sends to the other processing device one of the two partial authentication data and one of the two partial processing data.

5. A processing device in accordance with claim 2, wherein the processing device is an authentication system control device, comprising
    a first data divider that divides the authentication data into two partial authentication data;
    a second data divider that divides the processing data into two partial processing data; and
    a transmitter that sends to the other processing device one of the two partial authentication data and one of the two partial processing data.

6. A processing device in accordance with claim 3, wherein:
    the first divider generates two partial authentication data different from the first partial authentication data and the second partial authentication data,
    the second divider generates two partial processing data different from the first partial processing data and the second partial processing data,
    the transmitter sends to the other processing device one of the two generated partial authentication data and one of the two generated partial processing data, and
    the storage device stores the other of the two generated partial authentication data and the other of the two generated partial processing data.

7. A processing device in accordance with claim 4, wherein:
    the first divider generates two partial authentication data different from the first partial authentication data and the second partial authentication data,
    the second divider generates two partial processing data different from the first partial processing data and the second partial processing data,
    the transmitter sends to the other processing device one of the two generated partial authentication data and one of the two generated partial processing data, and
    the storage device stores the other of the two generated partial authentication data and the other of the two generated partial processing data.

8. A processing device in accordance with claim 5, wherein:
    the first divider generates two partial authentication data different from the first partial authentication data and the second partial authentication data,
    the second divider generates two partial processing data different from the first partial processing data and the second partial processing data,
    the transmitter sends to the other processing device one of the two generated partial authentication data and one of the two generated partial processing data, and
    the storage device stores the other of the two generated partial authentication data and the other of the two generated partial processing data.

9. A processing device in accordance with claim 1, wherein:
the processing device is an authentication terminal device of an authentication system comprising an input data fetcher that fetches input data; and
the receiver receives one of the two partial authentication data divided by an authentication system control device as the other processing device and receives one of the two partial processing data divided by the control device.

10. A processing device in accordance with claim 1, wherein:
the processing device is an authentication terminal device of an authentication system comprising an input data fetcher that fetches input data; and
the receiver receives one of the two partial authentication data divided by an authentication system control device as the other processing device and receives one of the two partial processing data divided by the control device.

11. A processing device in accordance with claim 2, wherein:
the processing device is an authentication terminal device of an authentication system comprising an input data fetcher that fetches input data; and
the receiver receives one of the two partial authentication data divided by an authentication system control device as the other processing device and receives one of the two partial processing data divided by the control device.

12. An authentication system consisting of an authentication terminal device and a control device,
the authentication terminal device comprising:
an input data fetcher that fetches the input data; and
a storage device that stores first partial authentication data that is part of authentication data prepared in advance for matching input data, and first partial processing data that is part of processing data used when executing at least part of a process of matching the input data with the authentication data;
the control device comprising: a storage device that stores second partial authentication data that is the remainder of the first partial authentication data and second partial processing data that is the remainder of the first partial processing data;
a first data linker that generates the authentication data from the first partial authentication data and the second partial authentication data;
a second data linker that generates the processing data from the first partial processing data and the second partial processing data;
an authentication module that performs authentication by executing the process of matching the input data with the authentication data based on the processing data;
first data divider that divides the authentication data into two partial authentication data;
second data divider that divides the processing data into two partial processing data; and
a transceiver that sends and receives one of the two partial authentication data and one of the two partial processing data with the authentication terminal device, wherein:
at least one of the terminal device and the control device has device verification data for verifying whether or not the other device is a legitimate device,
when the device verification data satisfies specified conditions, the first data linker generates the authentication data from the first partial authentication data and the second partial authentication data, the second linker generates the processing data from the first partial processing data and the second partial processing data, and the authentication module performs authentication by executing the process of matching the input data with the authentication data based on the processing data, and
when the device verification data does not satisfy specified conditions, the processing device deletes from the storage device the first partial authentication data and the first partial processing data.

13. A data management method of an authentication system consisting of an authentication terminal device and a control device,
the control device dividing, into two partial authentication data the authentication data prepared in advance for matching with the input data in the authentication terminal device,
the control device dividing, into two partial processing data the processing data used when executing at least part of the process of matching the input data with the authentication data,
the authentication terminal device storing in the storage of the authentication terminal device, as first partial authentication data, one of the divided two partial authentication data, and
storing in the storage of the authentication terminal device as first partial processing data one of the divided two partial processing data,
the control device storing in the storage of the control device, as second partial authentication data the other of the divided two partial authentication data, and
storing in the storage of the control device, as the second partial processing data the other of the divided two partial processing data,
and at a specified time, the control device performing authentication of the authentication terminal device using the control device verification data, and the terminal authentication device performing authentication of the control device using the control device verification data,
and when the control device authenticated the terminal authentication device and the authentication terminal device authenticated the control device,
the control device linking the first partial authentication data and the second partial authentication data and recovering the authentication data, linking the first partial processing data and the second partial processing data and recovering the processing data, dividing the recovered authentication data into two partial authentication data different from the first partial authentication data and the second partial authentication data, dividing the recovered processing data into two partial processing data different from the first partial processing data and the second partial processing data,
the authentication terminal device receiving from the control device as the first partial authentication data one of the divided two partial authentication data and storing this in the storage of the authentication terminal device, receiving from the control device as the first partial processing data one of the divided partial processing data and storing it in the storage of the authentication terminal device, the control device storing in the storage of the control device as the second partial authentication data the other of the divided partial authentication data, and storing in the storage of the control device as the second partial processing data the other of the divided partial processing data, and when the authentication terminal device did not authenticate the control device, the authentication terminal device deleting the first partial authentication data and the first partial processing data, and when the control device did not authenticate the authentication terminal device, the control device deleting the second partial authentication data and the second partial processing data.

* * * * *